United States Patent [19]

Moody, Jr. et al.

[11] 4,106,098

[45] Aug. 8, 1978

[54] COMPUTER CONTROLLED APPARATUS FOR PREPARATION OF POLYETHYLENE TEREPHTHALATE

[75] Inventors: Asa Carlyle Moody, Jr., Colonial Heights; Richard George Kenward, Richmond; James William Shiver, Midlothian, all of Va.

[73] Assignee: Allied Chemical Corporation, Morris Township, Morris County, N.J.

[21] Appl. No.: 764,795

[22] Filed: Feb. 2, 1977

[51] Int. Cl.² .............................................. G06F 15/46
[52] U.S. Cl. ..................................... 364/500; 364/103; 364/116; 364/121; 528/309
[58] Field of Search ............. 235/151.12, 150.1, 151.1; 260/75 R, 475 R, 346.1, 698, 699, 700; 364/496, 500

[56] References Cited

U.S. PATENT DOCUMENTS

| 3,108,094 | 10/1963 | Morgan ...................... 235/151.12 X |
| 3,275,809 | 9/1966 | Tolin et al. ...................... 235/151.12 |
| 3,475,392 | 10/1969 | McCoy et al. ........... 235/151.12 UX |
| 3,594,559 | 7/1971 | Pemberton ...................... 235/151.12 |
| 3,614,682 | 10/1971 | Smith ............................. 235/151.12 |
| 3,878,379 | 4/1975 | Moody, Jr. et al. ............ 235/151.12 |

Primary Examiner—Joseph F. Ruggiero
Attorney, Agent, or Firm—Fred L. Kelly

[57] ABSTRACT

A computer controlled apparatus for the preparation of high molecular weight, high quality polyethylene terephthalate polyester suitable for processing into fibers, films, and other shaped articles. The computer is interrelated with a hardware system in such a manner that it is capable of initiating process changes capable of producing a predetermined intrisic viscosity polymer during the polycondensation reaction stages.

3 Claims, 2 Drawing Figures

COMPUTER CONTROLLED APPARATUS FOR PREPARATION OF POLYETHYLENE TEREPHTHALATE

BACKGROUND OF THE INVENTION

This invention relates to apparatus for preparation of high molecular weight, high quality fiber-forming condensation polymer; more particularly, it relates to computer controlled apparatus for preparation of high molecular weight, high quality polyethylene terephthalate polyester suitable for processing into fibers, films and other shaped articles.

Pertinent patents in this field include U.S. Pat. No. 3,275,809 to Tolin et al. on measurement and control of polymerization reactions; U.S. Pat. No. 3,475,392 to McCoy et al. on process control system for maintaining constant polymerization conditions; U.S. Pat. No. 3,108,094 to Morgan on method and apparatus for controlling reaction conditions of an olefin polymerization; U.S. Pat. No. 3,594,559 to Pemberton on process control for polymerization control system; and U.S. Pat. No. 3,614,682 on computer control of polymerization process.

The most pertinent prior art is believed to be out U.S. Pat. No. 3,878,379 on polymer intrinsic viscosity control. Although this patent constitutes an important contribution to the art, our research in this field has been continued in an effort to develop a more reliable computer controlled apparatus that is essentially free of problems that result in plant upsets and reversion to manual control.

SUMMARY OF THE INVENTION

The present invention may be briefly stated as follows: Apparatus comprising at least three reactors connected in series arrangement for polycondensation of molten polyethylene terephthalate polyester, each reactor having adjustable means for setting the vapor pressure therein, characterized in that control apparatus for automatically controlling intrinsic viscosity of the polyethylene terephthalate polyester exiting from said reactors is provided, comprising:

(a) a digital computer having means for accepting analog input signals; means for generating analog output signals; a real-time clock in the computer; and means for feeding and storing an anticipatory control program in the computer;

(b) means for generating analog input samples from the penultimate and ultimate reactors in said series of reactors representing the vapor pressure, the inlet melt viscosity, the outlet melt viscosity, the inlet temperature, and the outlet temperature;

(c) means for generating analog input samples from the antepenultimate reactor in said series of reactors representing the vapor pressure, the outlet melt viscosity, and the outlet temperature;

(d) storing means for storing said analog input samples in the computer;

(e) a central processor in the computer for processing said analog input samples by relating said input samples to said anticipatory control program;

(f) means for controlling the intrinsic viscosity of the polyester exiting said antepenultimate reactor within the predetermined limits of said anticipatory control program, comprising means following said antepenultimate reactor for sensing melt viscosity and temperature of the polyester after exiting from said antepenultimate reactor; and signaling means for adjusting vapor pressure setting means in said antepenultimate reactor to approach a predetermined set point;

(g) means for controlling the intrinsic viscosity of the polyester exiting said penultimate and ultimate reactors within the predetermined limits of said anticipatory control program, comprising means ahead of and means following each reactor for sensing melt viscosity and temperature of the polyester before entering and after exiting from each reactor; and signaling means for adjusting vapor pressure setting means in each reactor to approach a predetermined set point; and (h) means to alert the operator and optionally to restrict computer control whenever reactor conditions monitored by the computer pass outside predetermined limits set by said anticipatory control program; and whenever an input signal is not received at the appropriate time in the central processor.

BRIEF DESCRIPTION OF THE DRAWINGS

FIG. 1 illustrates the control system superimposed upon the polyethylene terephthalate polyester process. FIG. 2 illustrates the direct digital control hardware associated with the digital computer.

DESCRIPTION OF THE PREFERRED EMBODIMENT

Figure 1:
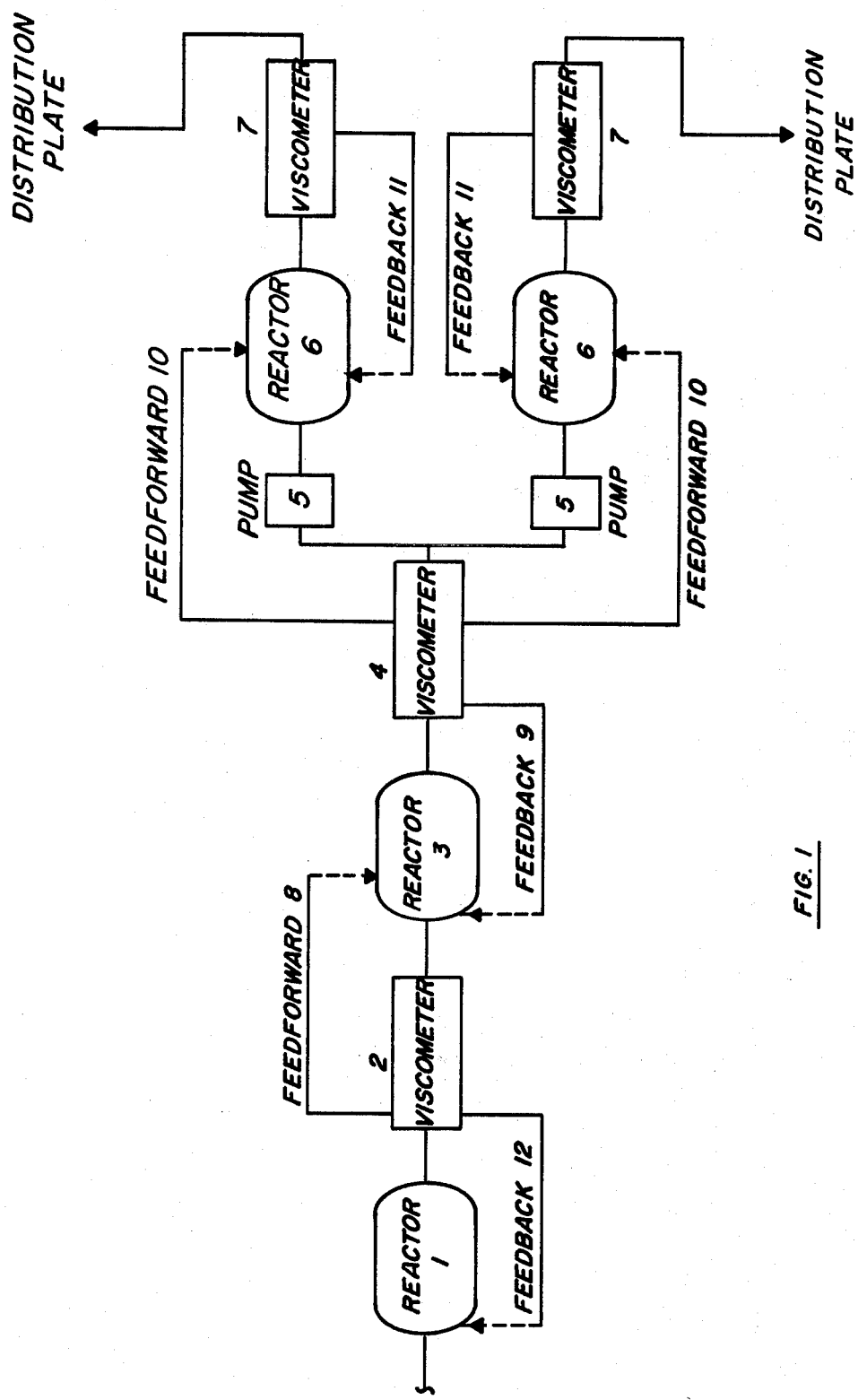
FIGS. 1 and 2 of the drawings, described in more detail below, schematically illustrate how the control system operates for each reactor.

The present apparatus comprises at least three reactors connected in series arrangement for polycondensation of molten polyethylene terephthalate polyester; each reactor having adjustable means such as an air-operated adjustable valve for setting the vapor pressure therein, whereby the removal of condensation by-products can be controlled. An in-line closed loop computer control system of the cascade type is provided and is associated with the reaction so as to control intrinsic viscosity of the polyester exiting from each reactor.

Preferably, at least the final reactor in the series of reactors is an essentially horizontal totally enclosed cylindrical reactor having essentially horizontal polyester flow, said reactor having a pool of the polyester in its lower portion and having driven wheels to create high polyester surface area to facilitate evaporation of volatiles from the polyester. Suitable reactors are described in U.S. Pat. No. 3,728,083 to Greenburg et al. and U.S. Pat. No. 3,976,431 to Boggs et al., which patents are incorporated herein by reference.

The control is based on means such as in-line viscometers for sensing melt viscosity of the polyester before the inlet and/or after the exit from each reactor, and means for sensing temperature of the entering polymer and/or the exiting polymer at each reactor. "Feedforward" and "feedback" algorithms of known form (in particular, proportional, integral, derivative) are used to provide intrinsic viscosity control operative to hold final viscosity within 0.5 percent variation (0.005 unit). Preferably, the intrinsic viscosity of the polyester exiting the final reactor is in the range 0.90 to 1.00, with less than 0.5 percent variation. The control apparatus operates in a closed loop control mode to maintain the vapor pressure in each reactor at a value determined by the computer as necessary to obtain a desired intrinsic viscosity.

An alarm and/or lock-in of the control to the existing setting is actuated if a monitored variable passes outside a predetermined limit. Control can then be switched from computer to conventional control until the malfunction of equipment has been corrected.

At intervals frequent enough to provide close monitoring, the computer control system evaluates intrinsic viscosity. The currently existing intrinsic viscosity is compared to the desired intrinsic viscosity. A new pressure set point is practically instantaneously calculated by the computer and corresponding signals are generated and actuate the pressure control means on the reactor. Intrinsic viscosity (V) may be determined from the following relation between melt viscosity (P) and viscometer temperature: $\log P = A + B \log V$, where $A$ and $B$ are linear functions of the viscometer temperature.

The computer has means for accepting analog input signals; means for generating analog output signals; a real-time clock; and means for feeding and storing an anticipatory control program in the computer. The control system includes means for generating analog input samples representing vapor pressure, inlet and/or outlet melt viscosity, and inlet and/or outlet temperature for a reactor; and the computer has storing means for storing said analog input samples; a central processor for processing said analog input samples by relating said samples to said anticipatory control program; and means described more fully below in connection with the drawings for controlling said polymer intrinsic viscosity within the predetermined limits of said anticipatory control program by use of signals from said computer responsive to said analog input samples. Associated with the controlling means is an alarm and/or lock-in means to give warning and/or to take a variable off control in the event of a malfunction.

The computer is also provided with a general purpose real time operating system and such conventional hardware as a multiple word disk, input/output terminals and contact closures.

Referring more particularly to the accompanying drawings, in FIG. 1, element 1 is a first polycondensation reactor; element 2 is a first viscometer; element 3 is a second polycondensation reactor, and element 4 is a second viscometer. Each viscometer is provided with means for measuring polymer temperature therein.

Elements (5,5) are pumps for feeding third polycondensation reactors (6,6). The polyester from reactors (6,6) passes to viscometers (7,7) and then to the distribution plate and spinnerette. Line 12 indicates information flow from viscometer 2 to reactor 1. Lines 8, 9, (10,10) and (11,11) indicate information flow from viscometer 2 to reactor 3, from viscometer 4 to reactor 3, from viscometer 4 to reactor (6,6) and from viscometers (7,7) to reactors (6,6).

Analog inputs via lines 8, 9, 10, 11, and 12 to the computer represent vapor pressure, melt viscosity, and temperature, for controlling reactors 1, 3 and reactors (6,6). Inputs pertaining to reactors (6,6) include additionally the pump speeds. The computer control system controls the vapor pressure in each of the reactors.

Figure 2:
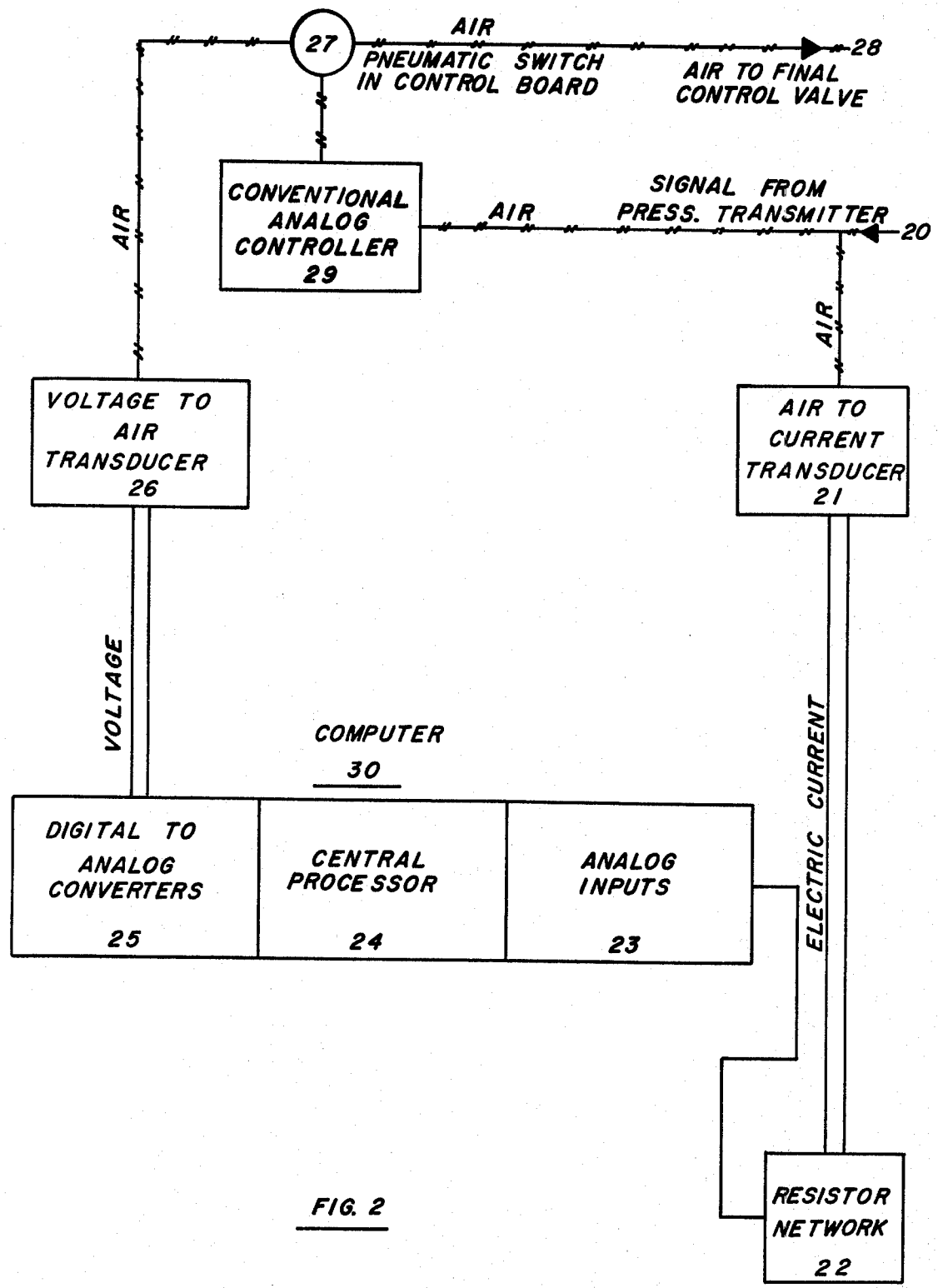

FIG. 2 is a schematic drawing showing the details of vapor pressure control. A signal in the form of air pressure, representing vapor pressure in a reactor, is transmitted via line 20 and is converted by transducer 21 to an electric current analog, which is brought to the proper voltage for input to the computer by resistor network 22. The voltage is impressed on analog input section 23 and is processed in digital form in central processor 24. In a corresponding manner, analog inputs representing melt viscosity and temperature and analog controller output are impressed on analog input section 23 and processed in central processor 24.

The digital output from central processor 24 is then converted to an electrical analog at section 25. It is then reconverted to an air pressure by transducer 26, and passes via pneumatic switch 27 and line 28 to an air controlled valve (not shown). The air controlled valve sets vapor pressure in the reactor within close tolerances.

Pneumatic switch 27 allows transferring control over the vapor pressure in the reactor from control by the computer, to control by a conventional analog controller 29, which is set by the operator.

The "feed forward" adjustments to be implemented by the computer are calculated from an algorithm of the form $$PADJ = Cl * \Delta V \qquad (1)$$

where:
* indicates multiplication;
PADJ = Adjustment to vapor pressure set point for the reactor;
Cl = Constant (set by process characteristics);
$\Delta V$ = Change of intrinsic viscosity at reactor inlet since last feed forward implementation.

Since a distance velocity lag exists between the reactor inlet viscometer and the reactor inlet, the adjustments are placed in a delay table and implemented after an appropriate delay time.

The "feedback" adjustments are calculated from an algorithm of the form:

$$PADJ = PN - PCSET$$

PN is calculated by the following algorithm:

$$PN = (PN-1) + K*[EN-(EN-1)] + KI*T*EN \\ + KD*[CV-2(CV-1) + (CV-2)]/T \qquad (2)$$

where:
* indicates multiplication;
PN, (PN−1) are the set points calculated currently and that last previously calculated;
PADJ is the adjustment to the pressure set point;
EN, (EN−1), are the error terms (target intrinsic viscosity-measured intrinsic viscosity) measured currently and at last previous measurement (i.e., at time intervals N, and N−1), CV, (CV−1), (CV−2) are intrinsic viscosity values measured currently and at last two previous measurements (i.e., at time intervals N, N−1, N−2); for polymer exiting from the reactor; KI is the integral time constant for the given reactor;
KD is the derivative time constant for the given reactor;
T is the time interval between execution of the supervisory routine,
PCSET is the currently existing vapor pressure set point.

The following examples illustrate technical advantages of the present invention. Parts are by weight. It will be understood that although these examples show proposed methods of operating the apparatus, this invention relates to the apparatus.

EXAMPLE 1

Forty-one and one-half parts per hour of purified terephthalic acid, 23 parts per hour of ethylene glycol and 0.88 part per hour of diisopropylamine are continuously fed to a paddle wheel mixer where they are converted to a paste. The paste mixture is then pumped from the mixer by a feed pump to the inlet of a circulating pump. The paste mixture is pumped with 40 parts of recirculating mixture by the circulating pump through a multiple tube and shell heat exchanger where it is heated to 260°–270° C. After leaving the heat exchanger, the mixture enters an esterifying reactor maintained at 260°–270° C. by conventional heating means, and 90–110 psig. pressure by means of an automatic vent valve. The reaction mixture leaving this reactor is split, with part returned to the inlet of the circulating pump where it is combined with fresh paste, and part is reduced in pressure to near atmospheric in a series of three reactors maintained at 260°–270° C., then flowed for polycondensation to the first in a series of reactors arranged and controlled as diagrammatically illustrated in FIGS. 1 and 2 of the drawings. Each of the final (ultimate) reactors (6,6) in the series of reactors is an essentially horizontal totally enclosed cylindrical reactor having an essentially horizontal polyester flow, a pool of polyester in its lower portion, and driven wheels to create high surface area in the polyester to facilitate evaporation of volatiles from the polymer. The pool of polyester in final reactors (6,6) is maintained by pumps (5,5). A change in inventory of polyester in said reactors may be estimated by observing the change in level on a conventional level recorder (not shown on drawing). A preferred reactor is described in detail in U.S. Pat. No. 3,976,431. Excellent results are also obtained with use of the reactor described in U.S. Pat. No. 3,728,083.

The polyethylene terephthalate polyester issuing from the last reactor stage has average intrinsic viscosity of 0.96 unit. It is passed at a temperature of 295° C. through a filter distribution plate to a 192-hole spinnerette, and processed into 1300 denier yarn. Quality of the yarn produced is excellent, i.e., tenacity is 9.2 gpd. and elongation at break is 14 percent. Moreover, in comparison with the apparatus of our U.S. Pat. No. 3,878,379, the present apparatus can be operated for significantly longer periods of time without reversion to manual control.

EXAMPLE 2

The procedure and apparatus of Example 1 is used except that outlet pumps (not shown) are used on final reactors (6,6) to control the inventory of polyester in said reactors.

As indicated in Example 1, the required inventory of polyester in reactors (6,6) is maintained by pumps (5,5). Although a change of inventory of polyester in said reactors can be estimated by observing the change in level of polyester in the reactor on a conventional level recorder, a change in viscosity of the polyester causes a redistribution of the polyester between the pool of polyester in the reactor and the polyester being removed from the pool by the driven wheels in the reactor. The conventional level recorder measures only the level of polyester in the pool and thus a redistribution of polyester would be indicated as a real change in level but a false change in polyester inventory. We have found that this problem may be overcome by having inlet and outlet pumps on the reactor and determining the polyester flow into and out of the reactor by measuring the inlet and outlet pump speeds. The difference between these two flows, over a period of time, gives the change in inventory and is independent of the distribution of polyester in the reactor.

We claim:

1. Apparatus comprising three reactors (1, 3, 6) connected in series arrangement for polycondensation of molten polyethylene terephthalate polyester, each reactor having a final control valve (28) for setting the vapor pressure therein, in combination with control apparatus for automatically controlling intrinsic viscosity of the polyethylene terephthalate polyester exiting from said reactors comprising:
   (a) a digital computer (30) having an analog input section (23) for accepting analog input signals; a central processor (24) for processing said analog input signals by relating said input signals to an anticipatory control program; and a digital to analog converter (25) for generating analog output signals;
   (b) viscometers (2, 4, 7) following each reactor for sensing melt viscosity and temperature of the polyester polymer, said viscometers having connecting lines (8, 9, 10, 11, 12) for transmitting analog input signals representing said melt viscosity and temperature to said computer, whereby the computer controls the vapor pressure in each reactor;
   (c) a pressure transmitter (20) connected by an air line to an air to current transducer (21) which is connected to a resistor network (22), for generating analog input signals to said computer representing reactor vapor pressure for each reactor; and
   (d) a voltage to air transducer (26) for adjusting the vapor pressure setting of said final control valve (28) in each reactor to a set point determined by currently existing intrinsic viscosity calculated by the computer (30) from melt viscosity and temperature of said polymer, compared to the last previous determination of intrinsic viscosity of said polymer; and by last previous calculated vapor pressure set point, constants for proportional gain, integral time and derivative time, and desired intrinsic viscosity of exiting polymer minus intrinsic viscosity of exiting polymer at last two previous times of measurement, and by time intervals between measurements and currently existing set point for vapor pressure within said reactor, these relations being solved by said computer which thereupon generates signals to which said vapor pressure final control valve (28) is responsive.

2. The apparatus of claim 1 wherein the inventory of polyester in the final reactor of said series of three reactors is maintained substantially constant by a pump (5) between the last two reactors in said series of reactors.

3. The apparatus of claim 2 wherein manual control of the intrinsic viscosity of the polyester may be substituted for computer control, if desired, by activating a conventional analog controller (29) which is connected to said final control valve (28) via a pneumatic switch (27).

* * * * *